United States Patent
Di Giovanni et al.

(10) Patent No.: US 11,156,287 B2
(45) Date of Patent: Oct. 26, 2021

(54) CAGE PLANET CARRIER FOR A SPEED-REDUCING UNIT WITH AN EPICYCLIC GEAR TRAIN

(71) Applicant: SAFRAN TRANSMISSION SYSTEMS, Colombes (FR)

(72) Inventors: Jean-Charles Michel Pierre Di Giovanni, Moissy-Cramayel (FR); Alexis Claude Michel Dombek, Moissy-Cramayel (FR)

(73) Assignee: SAFRAN TRANSMISSION SYSTEMS, Colombes (FR)

(*) Notice: Subject to any disclaimer, the term of this patent is extended or adjusted under 35 U.S.C. 154(b) by 0 days.

(21) Appl. No.: 16/607,618

(22) PCT Filed: Apr. 26, 2018

(86) PCT No.: PCT/EP2018/060804
§ 371 (c)(1),
(2) Date: Oct. 23, 2019

(87) PCT Pub. No.: WO2018/197645
PCT Pub. Date: Nov. 1, 2018

(65) Prior Publication Data
US 2020/0096091 A1    Mar. 26, 2020

(30) Foreign Application Priority Data

Apr. 27, 2017 (FR) .................................... 1753669

(51) Int. Cl.
*F16H 57/08* (2006.01)
*F16H 57/04* (2010.01)
*F16H 1/28* (2006.01)

(52) U.S. Cl.
CPC ....... *F16H 57/082* (2013.01); *F16H 57/0479* (2013.01); *F05D 2220/323* (2013.01);
(Continued)

(58) Field of Classification Search
CPC .. F16H 57/082; F16H 57/0479; F16H 57/043; F16H 57/0431; F16H 57/0428;
(Continued)

(56) References Cited

U.S. PATENT DOCUMENTS

| 4,429,587 A * | 2/1984 | Finn, III | F16H 57/0447 184/6.12 |
| 6,039,667 A * | 3/2000 | Schunck | F16H 57/0427 184/11.4 |

(Continued)

FOREIGN PATENT DOCUMENTS

| DE | 102016204982 A1 * | 9/2017 | ........... F16H 57/082 |
| EP | 1703174 A1 | 9/2006 | |

(Continued)

OTHER PUBLICATIONS

International Search Report dated Jul. 27, 2018, issued in corresponding International Application No. PCT/EP2018/060804, filed Apr. 26, 2018, 2 pages.

(Continued)

*Primary Examiner* — Roger L Pang
(74) *Attorney, Agent, or Firm* — Christensen O'Connor Johnson Kindness PLLC

(57) ABSTRACT

A planet carrier for a speed-reducing unit with an epicyclic gear train for a turbine engine, said planet carrier comprising a cage defining an internal space for assembling a central sun gear having an axis of rotation and an annular row of planet gears disposed around the axis and meshed with said sun gear, said cage comprising two substantially parallel annular walls centered on said axis and a cylindrical wall connecting said annular walls to their outer periphery, a first one of said annular walls being connected to a substantially cylindrical body, wherein a second one of said annular walls is formed as a single part with a lubrication grove, channel or duct.

13 Claims, 3 Drawing Sheets

(52) U.S. Cl.
CPC .............. *F05D 2260/40311* (2013.01); *F05D 2260/98* (2013.01); *F16C 2361/61* (2013.01); *F16H 1/28* (2013.01); *F16H 57/043* (2013.01); *F16H 57/0486* (2013.01); *F16H 2057/085* (2013.01)

(58) Field of Classification Search
CPC ...... F16H 57/0486; F16H 57/085; F16H 1/28; F05D 2220/323; F05D 2260/40311; F05D 2260/98; F16C 2361/61
USPC ................................................ 475/159, 331
See application file for complete search history.

(56) References Cited

U.S. PATENT DOCUMENTS

| | | | | |
|---|---|---|---|---|
| 10,494,998 | B2 * | 12/2019 | McCune | F02C 7/06 |
| 10,753,285 | B2 * | 8/2020 | McCune | F02C 7/32 |
| 2004/0147361 | A1 | 7/2004 | Yasuda et al. | |
| 2008/0268997 | A1 * | 10/2008 | Gooden | F16H 57/0431 475/160 |
| 2012/0322606 | A1 * | 12/2012 | Lewis | F16H 57/0479 475/159 |
| 2015/0247566 | A1 | 9/2015 | McKinzie et al. | |
| 2017/0240036 | A1 * | 8/2017 | Kobayashi | F16H 37/0806 |
| 2020/0080494 | A1 * | 3/2020 | Yoshitomi | F16H 57/0479 |
| 2020/0300173 | A1 * | 9/2020 | Simon | F16H 57/0482 |
| 2020/0325979 | A1 * | 10/2020 | Gravina | F16H 57/0479 |

FOREIGN PATENT DOCUMENTS

| | | | | |
|---|---|---|---|---|
| EP | 2615335 A1 | 7/2013 | | |
| EP | 3477158 A1 * | 5/2019 | ......... | F16H 57/0416 |
| JP | 2002098223 A * | 4/2002 | ......... | F16H 57/0482 |

OTHER PUBLICATIONS

Written Opinion of the International Searching Authority dated Jul. 27, 2018, issued in corresponding International Application No. PCT/EP2018/060804, filed Apr. 26, 2018, 5 pages.

Written Opinion of the International Searching Authority dated Jul. 27, 2018, issued in corresponding International Application No. PCT/EP2018/060804, filed Apr. 26, 2018, 6 pages.

International Preliminary Report on Patentability dated Oct. 29, 2019, issued in corresponding International Application No. PCT/EP2018/060804, filed Apr. 26, 2018, 1 page.

* cited by examiner

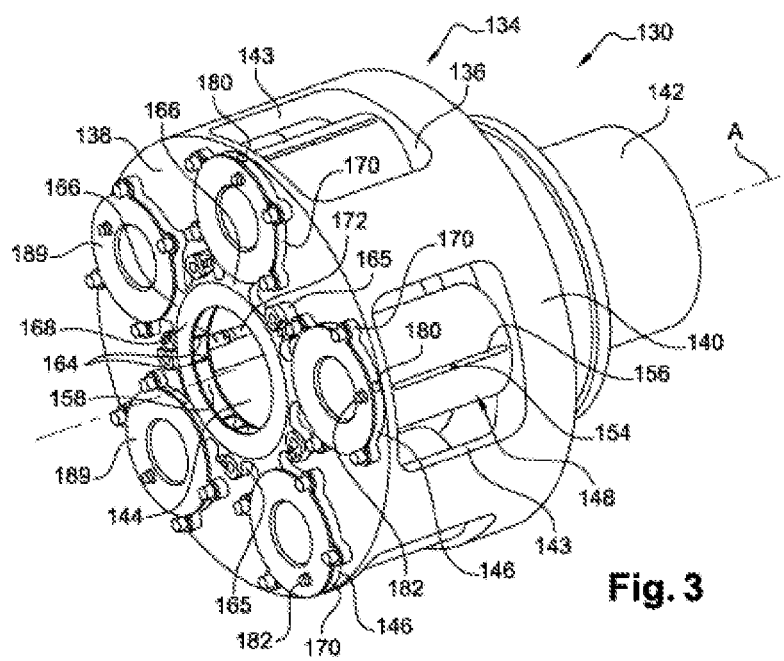
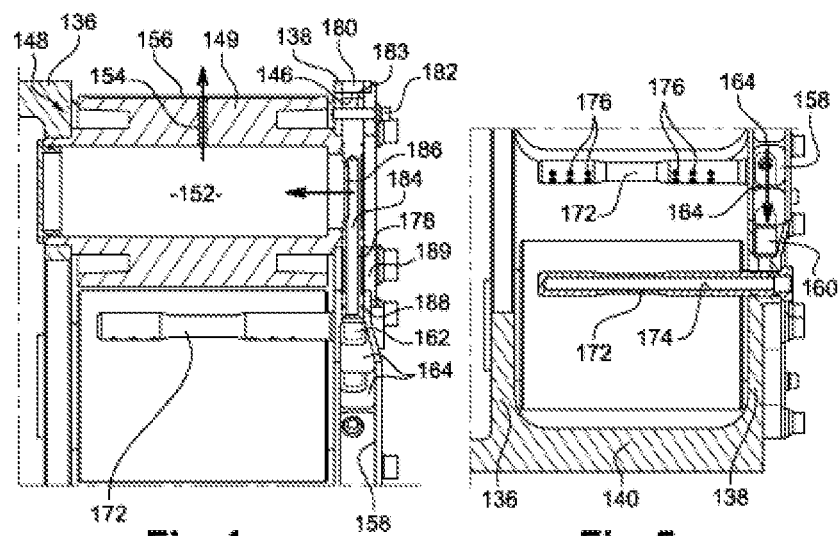

CAGE PLANET CARRIER FOR A SPEED-REDUCING UNIT WITH AN EPICYCLIC GEAR TRAIN

FIELD OF THE INVENTION

Embodiments of the present disclosure relate to a planet carrier for a speed-reducing unit with an epicyclic gear train, this planet carrier comprising a cage for receiving the sun gear and planet gears of the reduction gear.

BACKGROUND

The state of the art comprises, in particular, document US-A1-2015/0247566.

A speed-reducing unit with an epicyclic gear train of an aircraft turbine engine conventionally comprises a sun gear coupled with a first shaft and a ring gear extending around the sun gear. Planet gears are arranged between the sun gear and the ring gear and are meshed together and carried by a planet carrier coupled with a second shaft.

There are several types of planet carrier. FIG. 1 illustrates a cantilevered impeller planet carrier 10, described in application FR-A1-3 036 763. This planet carrier 10 comprises a cylindrical body 12 intended to be coupled to the second shaft and connected by a longitudinal end to an annular wall 14 for supporting parallel axes 16 of rotation of the planet gears 18. The axes 16 are regularly distributed around the axis A of rotation of the planet carrier and are secured at one of its longitudinal ends to the abovementioned annular wall 14. An impeller 20 is provided and fixed at their opposite longitudinal ends and fixed to the latter. This impeller 20 comprises means for lubricating both the bearings mounted between the axes 16 and the planet gears 18, and the gear teeth of the planet gears 18 and of the sun gear 22.

FIG. 2 illustrates another cage planet carrier 30 technology, the impeller 32 being provided on the cage 34 and therefore not being mounted cantilevered. The cage 34 comprises two annular walls 36, 38 substantially parallel and coaxial and a cylindrical wall 40 connecting the annular walls 36, 38 at their outer periphery. A first 36 of the annular walls is connected to the abovementioned body 42 and the second 38 receives the impeller 32. As in the preceding case, this impeller 32 comprises means for lubricating both the bearings mounted between the axes and the planet gears, and the gear teeth of the planet gears and of the sun gear.

This second cage planet carrier technology is advantageous in that the impeller transfers less force and is therefore less stressed in operation. Moreover, the mounting of the impeller is easier here and requires less complex tools than for a cantilevered impeller planet carrier.

However, a cage planet carrier of the current art is relatively bulky in the axial direction. The impeller provided on the cage of the planet carrier is furthermore subjected to wear phenomena at its interfaces with the other parts, which limit its lifespan.

The present disclosure proposes an improvement of this second technology, which brings a simple, effective and economical solution to at least one of these problems.

SUMMARY

According to the disclosure, this aim is achieved with a planet carrier for a speed-reducing unit with an epicyclic gear train for a turbine engine. The planet carrier comprises a cage defining an internal space for mounting a central sun gear of rotation axis A and an annular row of planet gears arranged around the axis A and meshed with the sun gear. The sun gear comprises means for coupling to a first shaft. The cage comprises two substantially parallel annular walls centred on the axis A and a cylindrical wall connecting the annular walls to their external periphery, a first of the annular walls being connected to a substantially cylindrical body comprising means for coupling to a second shaft, characterised in that a second of the annular walls is formed of a single part with lubrication means, which comprise an annular groove for receiving oil formed in the second wall and extending to the periphery of a central opening centred on the axis A of the second wall, the annular groove radially opening inwards.

The integration of the lubrication means directly in the cage makes it possible to remove the impeller of the prior art and, due to this, to reduce the axial bulkiness of the planet carrier.

The planet carrier according to the disclosure can comprise one or more of the following features, taken individually from one another, or in combination with one another:
- the lubrication means are formed in at least one axial excess thickness of the second annular wall;
- the groove is in fluidic communication with the channels and the ducts formed in the second wall and extending radially outwards from the groove;
- the radially external ends of the channels are connected to the longitudinal ends of lubricant nozzles, the lubricant nozzles extending substantially parallel to the axis A;
- the radially external ends of the ducts are connected to the internal radial ends of lubricant supply tubes of the planet carriers;
- each of the tubes is mounted in a radial bore of the second wall and passes through an axis for supporting one of the planet gears;
- each of the tubes comprises a longitudinal slot or a set of bores in communication with an internal cavity of the support axis;
- each of the tubes passes through a cover provided and fixed on the second wall, the cover supporting a longitudinal end of the support axis; and
- substantially radial fins are arranged in the groove; these fins facilitate the radial flow of lubricant from the internal periphery of the groove up to its bottom wall.

The present disclosure also relates to a turbine engine comprising a speed-reducing unit with an epicyclic gear train whose planet carrier is such as described above.

The turbine engine can comprise means for supplying lubricant to the groove, which comprise a series of injectors which are arranged around the axis A, and which pass through the opening. The injectors are preferably configured to spray lubricant radially outwards directly into the groove.

DESCRIPTION OF THE DRAWINGS

Other features and advantages will emerge from the following description of a non-limiting embodiment of the disclosure in reference to the appended drawings, wherein:

FIG. 3 is a schematic, perspective view of a cage planet carrier according to the disclosure;

FIGS. 4 and 5 are schematic, partial axial cross-sectional views of the planet carrier of FIG. 2;

DETAILED DESCRIPTION

FIG. 3 shows a planet carrier 130 for a reduction gear with an epicyclic gear train for an aircraft turbine engine. This planet carrier 130 is of the cage type 134, the cage comprising two coaxial annular walls 136, 138 and connected to their periphery by a cylindrical wall 140.

Figure 1:
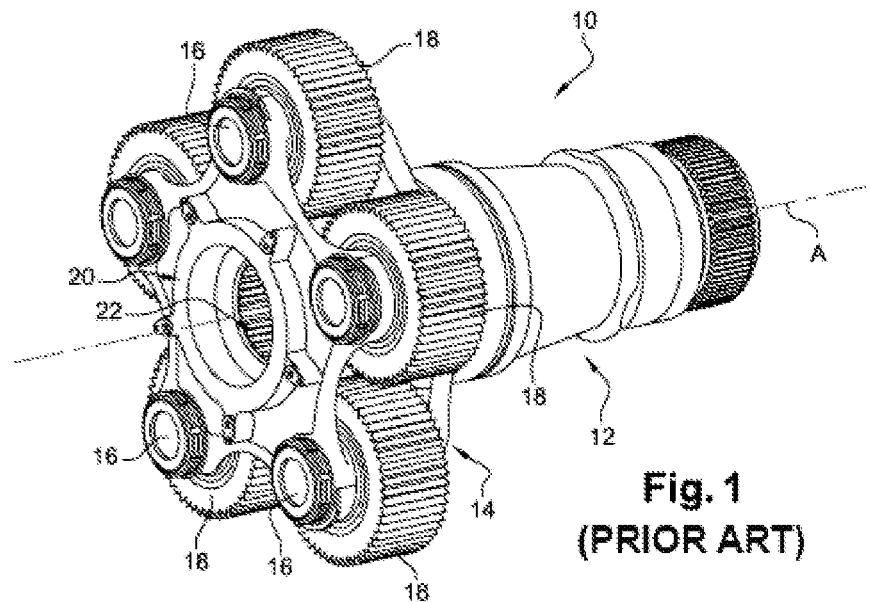
FIG. 1 is a schematic, perspective view of a cantilevered impeller planet carrier of the prior art.
Figure 2:
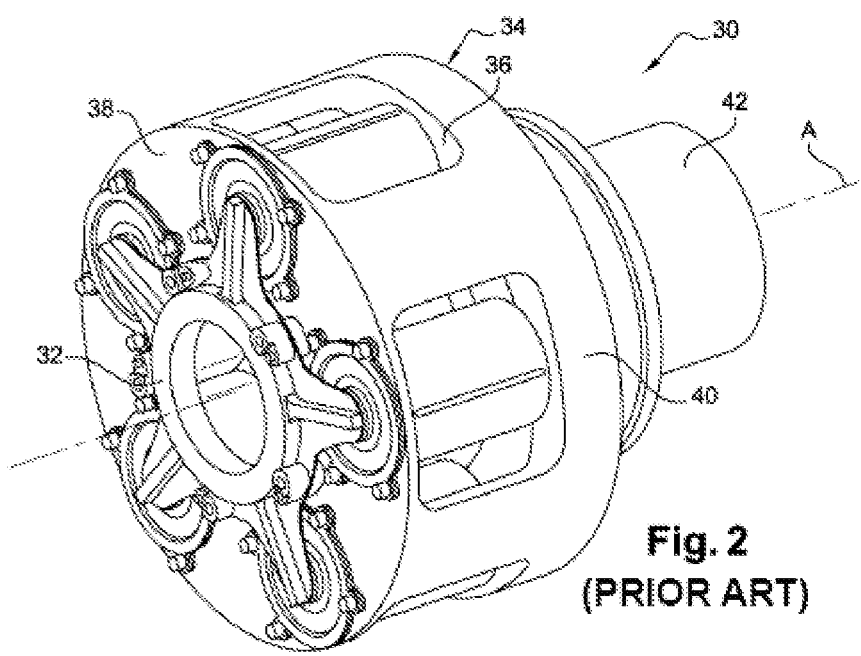
FIG. 2 is a schematic, perspective view of a cage planet carrier.

The annular wall 136 is secured to a substantially cylindrical body 142, partially visible, comprising meshing means with a shaft such as a fan shaft of the turbine engine. The coupling means are, for example, longitudinal slots of the type of those which can be seen in FIG. 1.

In the example represented, the cylindrical wall 140 is perforated and comprises through-holes 143 in the radial direction.

The wall 138 comprises a central opening 144 centred on the axis A and a series of orifices 146 regularly distributed around the axis A, the opening 144 and the orifices 146 passing through in the axial direction.

Figure 7:
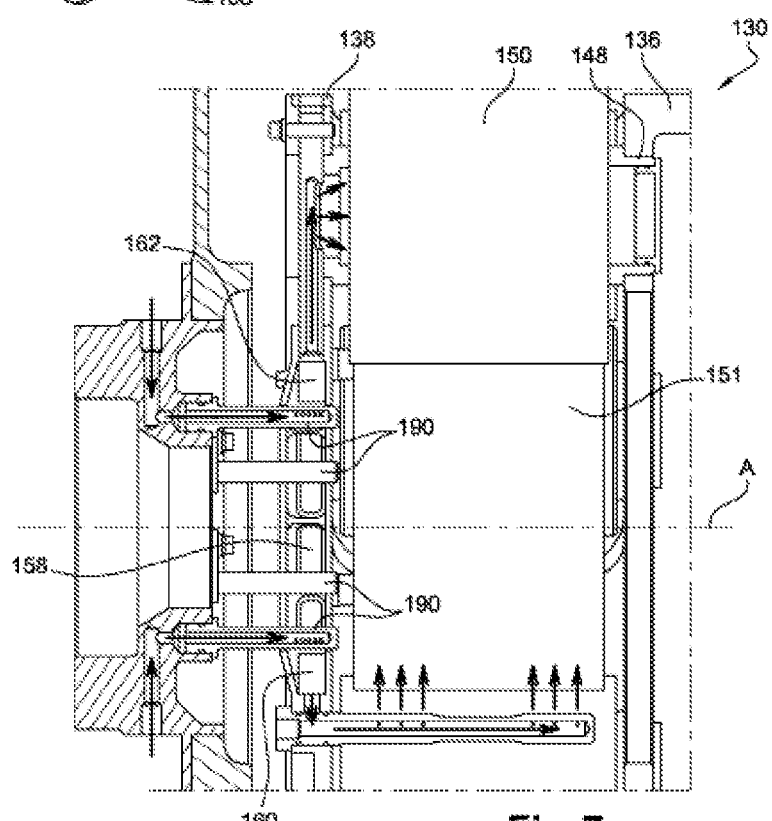
FIG. 7 is another schematic, partial axial cross-sectional view of the planet carrier of FIG. 2, as well as means for supplying lubricant from its lubrication means.

The orifices 146 serve for mounting the rotation axes 148 of the planet gears 150 schematically represented in FIG. 7. The axes 148 are parallel to the axis A and are mounted in the cage 134 by axial translation by passing through the orifices 146. They are fixed at their longitudinal ends on the walls 136, 138, respectively. As can be seen in FIG. 4, of which the cross-sectional plane axially intersects with an axis 148, this axis 148 is secured to a sliding bearing 149 around which is mounted the planet gear 150. The axis 148 is hollow and comprises an internal cylindrical cavity 152. The axis 148 and the bearing 149 are intersected by at least one radial duct 154, which opens out at its radially internal end into the cavity 152, and at its radially external end in a longitudinal ridge 156 of the periphery of the bearing (FIGS. 3 and 4).

Although this cannot be seen, the planet gears 150 rotationally mounted on the axes 148 have their external peripheries partially passing through the through-holes 143 in view of their meshing with an external ring gear of the reduction gear intended to surround the cage 134.

The planet gears 150 mesh with the sun gear 151, which comprises internal rectilinear slots for coupling to another shaft such as a turbine shaft.

The central opening 144 is delimited externally by an annular portion of excess thickness of the wall 138, wherein is formed an annular groove 158. This groove 158 extends around the axis A and opens out radially inwards. Its radially external bottom wall comprises orifices in fluidic communication with radial channels 160, on the one hand, and radial ducts 162, on the other hand.

Inside the groove 158, fins 164 can be arranged substantially radial to facilitate the radial flow of lubricant form the internal periphery of the groove up to its bottom wall and the abovementioned orifices.

In the represented example, the number of channels 160 is equal to the number of ducts 162, which is equal to the number of axes 148 and of planet gears 150. This number is here five. The channels 160 are regularly distributed around the axis A and the ducts 162 are regularly distributed around the axis A, each duct 162 being arranged between two adjacent channels 160. The ducts and channels are formed in excess thicknesses 165, 166 of the wall 138. The excess thicknesses 165, wherein the channels 160 are formed, radially extend outwards from the excess thickness 168, wherein the groove 158 is formed. The excess thicknesses 166, wherein the ducts 162 are formed, radially extend between the excess thickness 168 and the bosses 170 of the wall 138, where the orifices 146 are formed.

Each of the channels 160 communicates at its radially external end with a longitudinal end of a tubular nozzle 172 which can be seen, in particular, in FIGS. 4 and 5. The nozzles 172 have an elongated shape and extend parallel to the axis A. They are five of them and they are regularly distributed around the axis A, each being arranged between two adjacent axes 148. They are mounted by axial translation through the through-orifices of the wall 138. They each comprise a longitudinal internal cavity 174, of which one longitudinal end is in fluidic communication with a channel 160. Each nozzle 172 further comprises substantially radial orifices 176, distributed over its length and opening out into the cavity 174. The lubricant brought by the channels 160 to the nozzles 172 is intended to be sprayed over the gearings of the planet gears 150 and of the sun gear 151 in operation (see arrows of FIG. 5, as well as FIG. 7).

Figure 6:
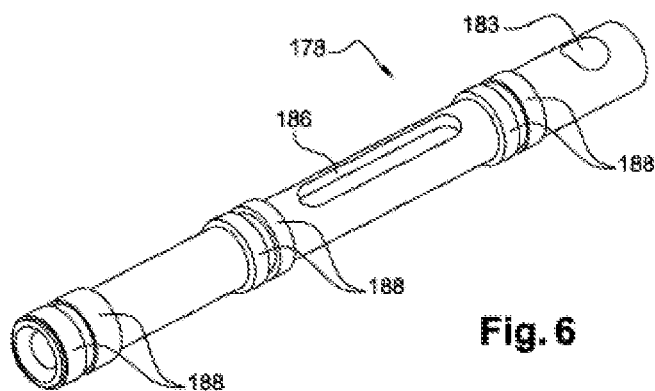
FIG. 6 is a schematic, perspective view of a supply tube of the planet carrier of FIGURE.

Each of the ducts 162 communicates at its radially external end with a longitudinal end of a supply tube 178 which can be seen in FIG. 4. The tubes 178 have an extended shape and extend substantially radially with respect to the axis A. There are five of them and they are regularly distributed around the axis A by each being engaged in a radial bore 180 passing through a boss 170 and the corresponding excess thickness 166 of the wall 138. The bores 180 open out at their radially external ends on the external periphery of the wall 138 and the tubes 178 are mounted in these bores by radial translation from the outside inwards, until their internal radial ends are in fluidic communication with the radially external ends of the ducts 158, as can be seen in FIG. 4. Screws 182 are thus screwed into the wall 138, and in particular in tapped orifices of the bosses 170, to immobilise the tubes 178 in the bores 180. A screw 182 can pass through a through-orifice 183 of the corresponding tube 178 (FIGS. 4 and 6). In a variant, the screw 182 can be replaced by a dowel or pin.

FIG. 6 shows a tube 178. This tube 178 has an extended shape and comprises an internal longitudinal cavity 184 of which one longitudinal end axially opens out and is intended to be in fluidic communication with a duct 162. The other longitudinal end of the tube is closed. The tube comprises a longitudinal slot 186, substantially at its middle, which communicates with the cavity 184. In a variant, the slot 186 can be replaced by a set of bores.

Annular gaskets 188 are advantageously provided around the tube. One or more of the first gaskets can be located at the open longitudinal end of the tube and intended to engage with the wall 138, and other gaskets can be located on either side of the slot 186 (or bores), respectively, and intended to engage with the corresponding axis 148 (see FIG. 4). The slot 186 (or bores) is intended to open out into the cavity 152 of this axis 148 in view of supplying lubricant to the axis 148 and to the bearing 149. The lubricant brought by the ducts 162 to the tubes 178 is intended to be injected into the cavities 152, then to flow through the ducts 154 up to the periphery of the bearings 149 (see arrows of FIG. 4).

In the example represented, each tube 178 also passes through an annular cover 189 returned and fixed, for example by screws, on the wall 138, on the side opposite the planet gears 150. Each cover 189 covers the corresponding boss 170 of the wall 138 and is intended to centre the corresponding axis 148 in the orifice 146 of the wall 138.

FIG. 7 shows the means for supplying lubricant to the groove 158, which comprise a series of injectors 190, for example five injectors, which are arranged around the axis A and pass through the opening 144 of the wall 138 of the cage 134. The injectors 190 are carried by a stator and spray lubricant radially outwards directly into the groove 158, which will then flow into the channels 160 and ducts 162, as mentioned above.

The disclosure presents numerous advantages with respect to the prior art: a reduced axial bulkiness, the removal of a countersinking part (impeller) which is difficult to machine, due to the cage, which is easier to machine by turning, less statically indeterminate during mounting, no more fretting problem in the impeller, the possibility of having the nozzles closer to the sun gear, the increased rigidity of the planet carrier, shorter and lighter nozzles (fewer dynamic problems), etc.

The invention claimed is:

1. A planet carrier for a speed-reducing unit with an epicyclic gear train for a turbine engine, said planet carrier comprising:
   a cage defining an internal space for mounting a central sun gear about a rotation axis; and
   an annular row of planet gears arranged around the axis and meshed with said sun gear, said sun gear configured to be coupled to a first shaft,
   said cage comprising two parallel annular walls centered on said axis and a cylindrical wall connecting said annular walls at their external periphery, a first of said annular walls being connected to a cylindrical body configured to be coupled to a second shaft, a second of said annular walls being formed of a single part with an annular groove for receiving oil, the annular groove formed in said second wall and extending to the periphery of a central opening centered on the axis of the second wall, said annular groove opening out radially inwards, and
   substantially radial fins being arranged in said groove.

2. The planet carrier according to claim 1, wherein said groove is formed in at least one axial excess thickness of said second annular wall.

3. The planet carrier according to claim 1, wherein said groove is in fluidic communication with channels and ducts formed in said second wall and extending radially outwards from said groove.

4. The planet carrier according to claim 3, wherein radially external ends of said channels are connected to longitudinal ends of lubricant nozzles, said lubricant nozzles extending substantially parallel to said axis.

5. The planet carrier according to claim 3, wherein radially external ends of said ducts are connected to the internal radial ends of tubes for supplying lubricant to said planet gears.

6. The planet carrier according to claim 5, wherein each of said tubes is mounted in a radial bore of said second wall and passes through an axis for supporting one of said planet gears.

7. The planet carrier according to claim 6, wherein each of said tubes comprises a longitudinal slot or a set of bores in communication with an internal cavity of said support axis.

8. The planet carrier according to claim 6, wherein each of said tubes passes through a cover provided and fixed on said second wall, said cover supporting a longitudinal end of said support axis.

9. An aircraft turbine engine, comprising a speed-reducing unit with an epicyclic gear train, the epicyclic gear train comprising the planet carrier according to claim 1.

10. The aircraft turbine engine according to claim 9, comprising a series of injectors arranged around said axis and passing through said opening, said series of injectors configured to supply lubricant to said groove.

11. The aircraft turbine engine according to claim 10, wherein said injectors are configured to spray lubricant radially inwards directly into said groove.

12. The planet carrier according to claim 2, wherein said at least one axial excess thickness of the second annular wall delimits externally the central opening.

13. The planet carrier according to claim 1, wherein the cylindrical wall is perforated.

* * * * *